(12) United States Patent
Bennington

(10) Patent No.: US 7,216,682 B1
(45) Date of Patent: May 15, 2007

(54) SPLIT WHEEL STUMP CUTTER WITH REPLACEABLE TOOTH BLOCKS AND CUTTING TEETH

(76) Inventor: John T. Bennington, 12635 Bentbrook Dr., Chesterland, OH (US) 44026

( * ) Notice: Subject to any disclaimer, the term of this patent is extended or adjusted under 35 U.S.C. 154(b) by 50 days.

(21) Appl. No.: 11/097,654

(22) Filed: Apr. 1, 2005

Related U.S. Application Data

(62) Division of application No. 10/762,917, filed on Jan. 22, 2004, now Pat. No. 6,877,535, which is a division of application No. 10/035,991, filed on Dec. 31, 2001, now Pat. No. 6,698,477.

(51) Int. Cl.
*A01G 23/06* (2006.01)
*B27M 3/00* (2006.01)

(52) U.S. Cl. .................. 144/24.12; 144/230; 144/228; 407/46; 407/47

(58) Field of Classification Search ............... 144/334, 144/24.12, 230, 288, 228; 407/32, 40, 46, 407/47; 241/295
See application file for complete search history.

(56) References Cited

U.S. PATENT DOCUMENTS

| | | | | |
|---|---|---|---|---|
| 1,795,702 A * | 3/1931 | Barton | ..................... | 101/415.1 |
| 1,938,773 A * | 12/1933 | Ernst et al. | ................... | 407/39 |
| 3,097,541 A * | 7/1963 | Kindig | ........................ | 474/98 |
| 4,441,434 A * | 4/1984 | Howard | ................... | 110/101 R |
| 4,506,711 A * | 3/1985 | Armbruster et al. | ........ | 144/230 |
| 4,557,305 A * | 12/1985 | Berger et al. | ............... | 144/230 |
| 4,827,995 A * | 5/1989 | Wilson | .................... | 144/24.12 |
| 4,974,649 A * | 12/1990 | Manning | .................... | 144/235 |
| 5,005,622 A * | 4/1991 | Beach et al. | ................ | 144/241 |
| 5,135,035 A | 8/1992 | Mills | .......................... | 144/241 |
| 5,529,439 A * | 6/1996 | Werner et al. | ............... | 407/39 |
| 5,743,314 A * | 4/1998 | Puch | ....................... | 144/24.12 |
| 5,800,079 A * | 9/1998 | Qvarth | ........................ | 407/46 |
| 5,868,036 A * | 2/1999 | Salzman | ....................... | 74/450 |
| 6,024,143 A | 2/2000 | Ritchey | .................... | 144/24.12 |
| 6,213,931 B1 | 4/2001 | Twardowski et al. | ........ | 541/540 |
| 6,325,574 B1 * | 12/2001 | Treige | .......................... | 407/35 |
| 6,698,477 B1 * | 3/2004 | Bennington | ................. | 144/235 |

* cited by examiner

*Primary Examiner*—Bena Miller

(57) ABSTRACT

A stump grinding apparatus having a split cutting wheel includes several replaceable cutter blocks secured to the periphery of the wheel. One or more replacement teeth are removably anchored in holes in each block and may also be mounted on holes in the side of the split wheel as well. The teeth are typically provided with a hardened cutting face, and are reinforced with an extension projecting back from the face. Each tooth includes a shank which fits into one of the holes. The shank contains a groove which receives a spring clip or a spring pin for securing the tooth in the hole. The wheel periphery contains individual recesses that are shaped to receive the cutter blocks. Each block includes means for insuring alignment of the block in the corresponding recess. The block is wedged tightly into its recess to reduce the likelihood of accidental removal.

10 Claims, 4 Drawing Sheets

SPLIT WHEEL STUMP CUTTER WITH REPLACEABLE TOOTH BLOCKS AND CUTTING TEETH

CROSS REFERENCE TO RELATED APPLICATIONS

This application is a division of patent application Ser. No. 10/762,917, filed Jan. 22, 2004 now U.S. Pat. No. 6,877,535, which is a division of Ser. No. 10/035,991, filed Dec. 31, 2001, now U.S. Pat. No. 6,698,477 B1.

BACKGROUND OF THE INVENTION

1. Field of the Invention

This invention relates to the field of cutting wheels useful for grinding tree stumps. More specifically, it relates to a stump cutter assembly and the component parts thereof.

2. Description of the Related Art

It is known to provide a stump grinding apparatus to cut and dispose of tree stumps. The device finds use for agricultural applications, for proper lawn maintenance and care, and for site development. It is often required to lower a protruding stump to a level that is below grade so that it will not interfere with plowing, disking and other farm tasks. For pleasing appearance of residential lawns, stumps of dead and fallen trees must likewise be cut away to a point that is below grade to allow for soil to be placed thereover for seeding or planting. When used for site development, the apparatus permits soil to be moved as needed.

Typically, such a device includes a rotatable grinding wheel having a plurality of cutting teeth disposed circumferentially about the wheel. The wheel can be powered by a chain drive, or by gear or belt, or may be at the end of a movable boom driven by a diesel or gasoline engine. The cutting teeth of the stump grinders commonly encounter more than just wood when performing their tasks. They are brought into contact with rocks and all manner of buried debris, such as re-bar, wire, cinder block and other materials of construction. Because of these hidden obstacles, the teeth are subject to considerable wear and breakage, and the peripheral surface of the cutting wheel experiences considerable wear as well.

BRIEF DESCRIPTION OF THE INVENTION

The present invention relates to a stump cutting wheel assembly. The assembly comprises a wheel having a plurality of recesses spaced around the circumference thereof. A replaceable cutter block is inserted into each recess and is secured to the wheel. The block has a leading surface and a trailing surface, two sides colinear with the sides of the wheel, a top with a radius of curvature corresponding to that of the cutting wheel, and a bottom surface corresponding to the surfaces of the recess. A plurality of cutting teeth, each having a shank, is removably inserted into holes in the cutter block and/or the sides of the wheel. Each shank has a free end and an abutment end, the abutment end terminating in a rearwardly extending shoulder that co-operates with the block to serve as a stop to limit linear and rotational movement of the shank in the block or the wheel. An extension on the tooth projects rearwardly of the tooth face to rest against the adjacent surface of a block or the wheel to provide additional support for the tooth to resist shock and bending moments.

The cutting wheel is a split wheel having a first half and a second half joined to one other along the diametric surface thereof, each half having a semicircular cut-out in the diametric surface to permit the wheel to be mounted around a hub keyed on a drive shaft. The two halves of the wheel are joined together using clamping means comprising a pair of butterfly clamps. Each butterfly clamp fits in corresponding slots in both halves of the wheel. The clamp engages a bolt extending from the semicircular periphery along mating kerfs in the diametric surfaces. Preferably, the end of the kerfs immediately radially inward of the periphery is enlarged to form a shoulder which receives a sleeve through which the bolt passes.

Each cutter block includes means cooperating with a corresponding recess in the peripheral surface of the wheel to align the blocks with the rotational direction of the wheel. The cooperating means includes a slot in the bottom of the recess, a corresponding slot in the bottom surface of the block and a key aligning the two slots. The back surface of each recess forms an undercut angle, and the trailing surface of the block is co-planar therewith. A hole extends through each block from the top surface of the block to the bottom surface, and a threaded fastener such, as a bolt, passes through the hole for fastening the block into the recess of the cutting wheel. The bolt is threaded into a nut plate disposed in a slot in the wheel radially beneath the block. A generally V-shaped groove is formed between the front wall of the recess and the leading edge of the block, and a wedge is located between the two walls of the groove, and is secured to said nut plate with a second threaded fastener. The shank on each tooth includes a circumferential groove, and a spring clip or a spring pin engages the groove to anchor the tooth in a corresponding hole in the block or in the wheel.

The invention further relates to a split wheel for a stump grinder. The split wheel comprises a first half and a second half joined to one another along the diametric surfaces thereof. Each half has an axially positioned semicircular cut-out that allows the two halves to be assembled together. The two halves are assembled on a conventional hub using a pair of clamps, such as butterfly clamps. A slot is located inboard of the semicircular periphery of each half and extends in from each mating plane to receive one clamp. A groove along the mating surface joins each slot to the semicircular periphery to receive a bolt extending in from the periphery and threaded into one of the clamps to hold the two halves together. The groove includes a shoulder recessed beneath the peripheral surface to receive a sleeve which, in turn, receives the head of the bolt.

The split wheel further includes a plurality of recesses in the periphery thereof, each recess shaped to receive a removable cutter block. Each recess has a front edge, a bottom edge and a rear edge. A threaded block fastener is located near the front edge. The rear edge is undercut to conform to the trailing surface of the block. A circumferentially extending slot in the bottom of the recess is adapted to receive an alignment key engageable with a corresponding slot in the bottom of each block. The threaded block fastener comprises a slot radially inwardly of each recess, and a nut plate in the slot having a threaded hole to receive the block fastener. The nut plate includes a second threaded hole to receive a threaded fastener extending through a block wedge. Each half of the wheel includes a semicircular cut-out along the diametric surface on either side of the axially positioned cut-out, forming a non-axially located circular hole with the corresponding cut-out in the other half. A conventional mounting hub comprises two flanges bolted on either side of the wheel. A pair of holes extends through the two flanges aligned with the two non-axial holes in the wheel, and drive pins extends through these holes in the mounting hub. The mounting hub includes a keyway for mounting the wheel on the drive shaft.

The invention also relates to a replaceable cutter block adapted to be inserted into a recess in the periphery of the cutting wheel for a stump grinder. The cutter block has a top surface with a radius of curvature corresponding to the outer periphery of the cutting wheel. The block also includes a bottom surface that is co-planar with the bottom of the recess, two parallel side surfaces, a leading surface and a trailing surface. The trailing surface corresponds to the rear surface of the recess. At least one hole in the block receives a removable cutting tooth, the hole extending from the top surface or a side surface at an angle of inclination from the said surface toward the back surface of a block. The hole extends into the block toward the trailing surface at an angle of between about 30° and about 60°. The block includes means, such as a slotted key way adapted to receive a key extending longitudinally along the bottom thereof, to engage a corresponding alignment means in the bottom of the recess. A threaded fastener secures the block into the recess of the cutting wheel. This fastener comprises a bolt adapted to be threaded into a nut plate positioned in a slot within the cutting wheel radially beneath the block. The trailing surface of the block conforms to the rear wall of the recess and has an angle of less than 90° but greater than about 60° with respect to the bottom of the block.

The invention further comprises a cutting tooth to be removably engaged with a stump cutting wheel or a block on the circumference of such a wheel. The tooth comprises a planar cutting surface adapted to form an angle generally orthogonal to a side or a top of said block when the tooth is engaged therewith. It also includes a shank to be inserted into a corresponding hole in the block, said shank having a free end and an abutment end. The abutment end terminates in a shoulder formed at right angles to the shank and adapted to cooperate with the block to serve as a stop to limit the linear and rotational movement of the shank into the block. An extension projects rearwardly of the tooth face and is adapted to rest against the planar side or top surface of a block when the tooth is inserted into the block, said extension serving to provide a support for the tooth when in use. The shank typically includes a circumferentially extending groove and a spring clip engaging the groove for the purpose of providing a compressive fit of the tooth in the corresponding hole in a block. The shank forms an interior angle of between about 30° and about 60°, preferably about 45°, with respect to the cutting face of the tooth. The angle corresponds to the diagonal angle in the block or cutting wheel so as to provide the proper cutting angle for the face when the tooth is properly mounted.

DETAILED DESCRIPTION OF THE INVENTION

The grinding wheel of the present invention is fabricated in two halves that are adapted to be held together by a butterfly type clamp. The halves are aligned in place by a wheel key which is held tight by a bolt going through the middle of the wheel key and the wheel, to the butterfly wheel clamp.

The grinding wheel also has removable wheel sections called blocks. These blocks are held in place in four ways. One, the wheel is machined with a cut-out specifically designed for the blocks to set into them. The wheel receives the block with the back and bottom face of the block fitting into it. The space between the front face of the block and the wheel is designed for a wedge to set into it. Two, a safety bolt goes through the block to a common nut plate or a nut in the wheel. Three, a wedge is set in between the wheel and front face of the block which is held in place by a bolt that goes through the wedge and into the common nut plate or nut in the wheel. Fourth, a key and keyway slips into the block and wheel. This is called a block key.

The wheel and the block have holes machined into them. Some are for the teeth and some for the bolts. Each hole is machined into the wheel in such a direction that, when the cutting tooth is inserted into it, the tooth will be at the appropriate angle for stump grinding. These holes are also machined to fit the design of the tooth in such a way that they are prevented from rotating or moving in the hole when the wheel is in motion.

The tooth has an extension on its top backside, which rests against the wheel or block. This gives support to the tooth and also keeps a tooth from turning when in motion. The tooth has a shank that goes into the wheel hole or block hole. The shank has a spring clip on it, which holds the tooth in tight.

All the teeth can be easily removed from a backside of the wheel or block. Teeth are removed with a punch and hammer. A block can be changed as needed by removing the wedge bolt and the block bolt.

Figure 1:
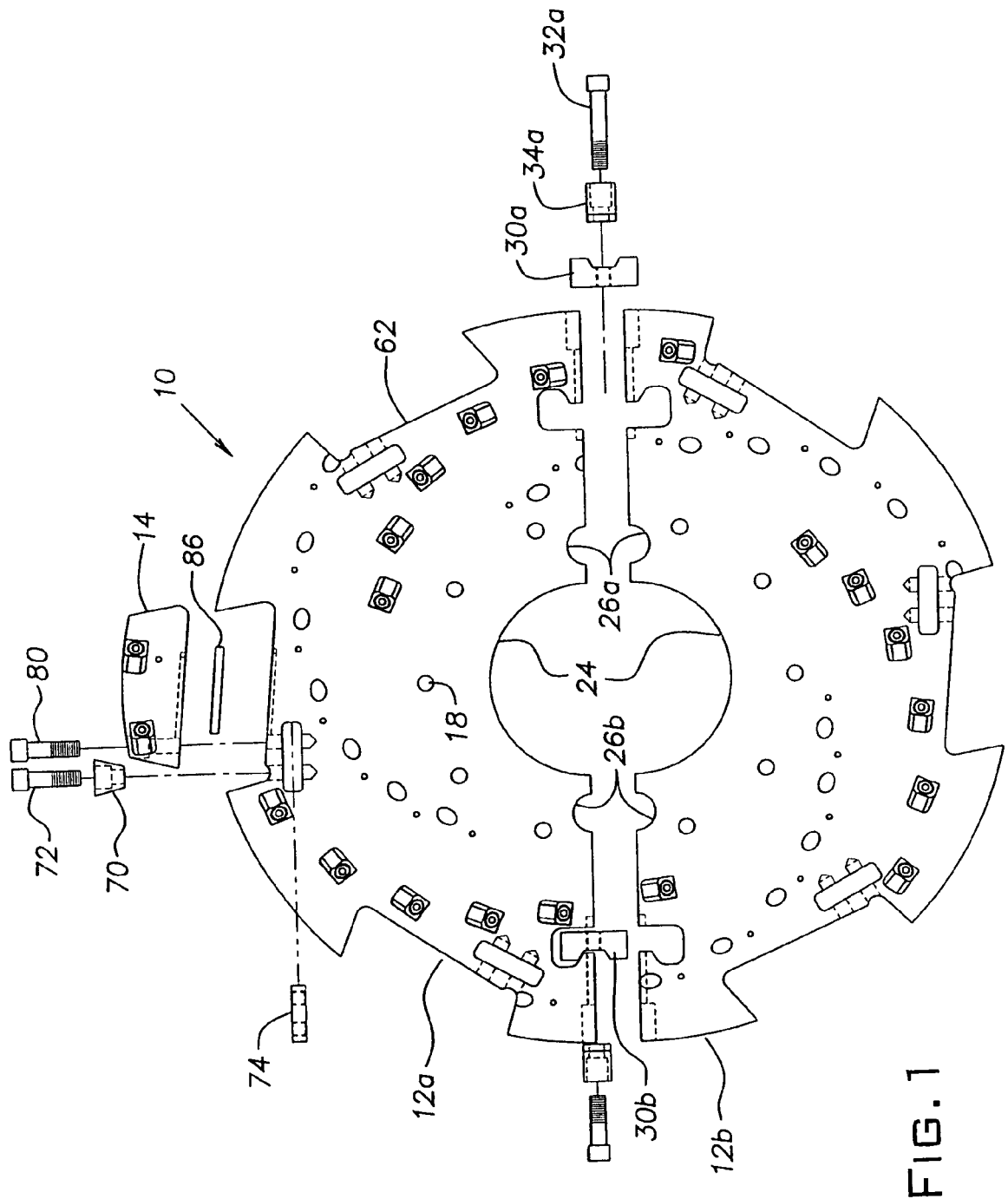
FIG. 1 is an exploded view of the overall assembly of the present invention.
Figure 2:
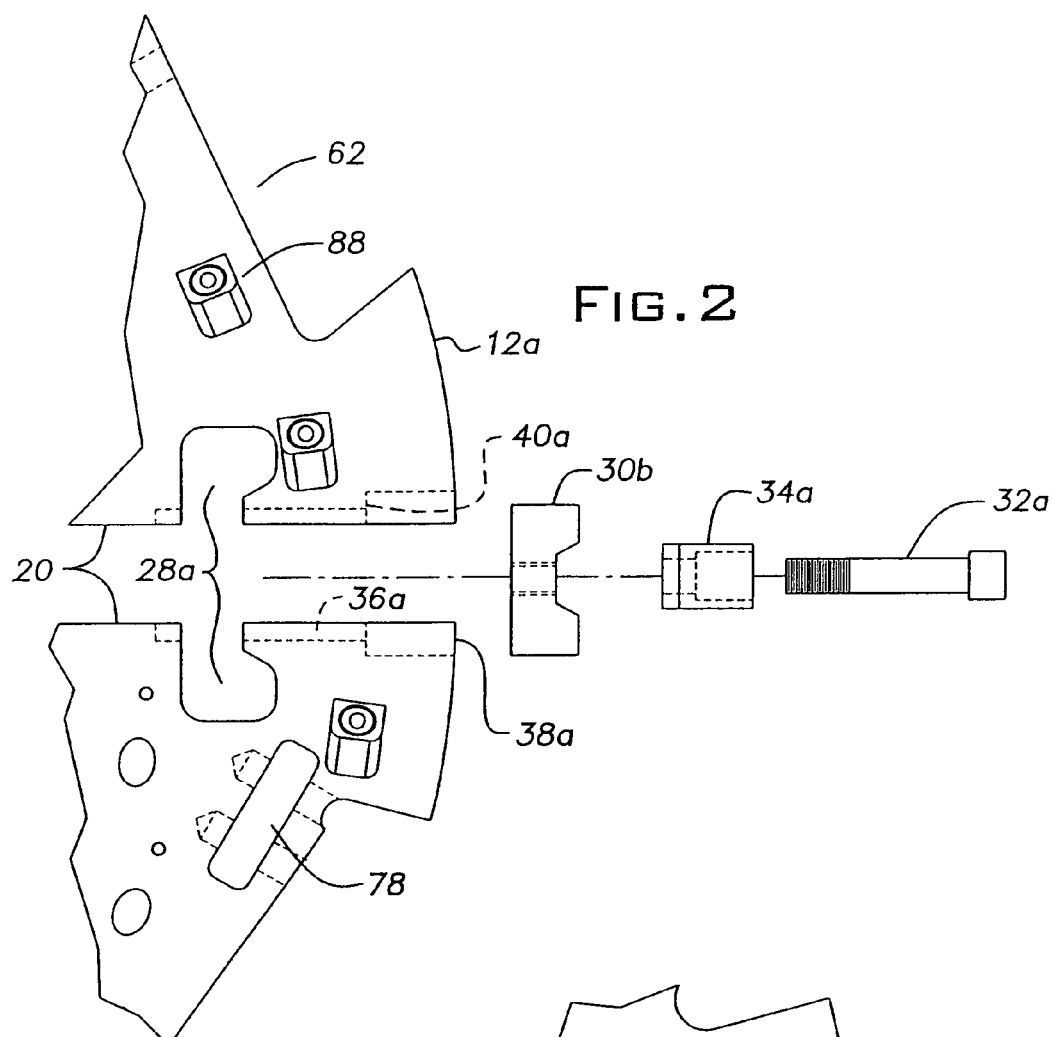
FIG. 2 is an enlarged, exploded view of the cutting wheel clamp arrangement.
Figure 3:
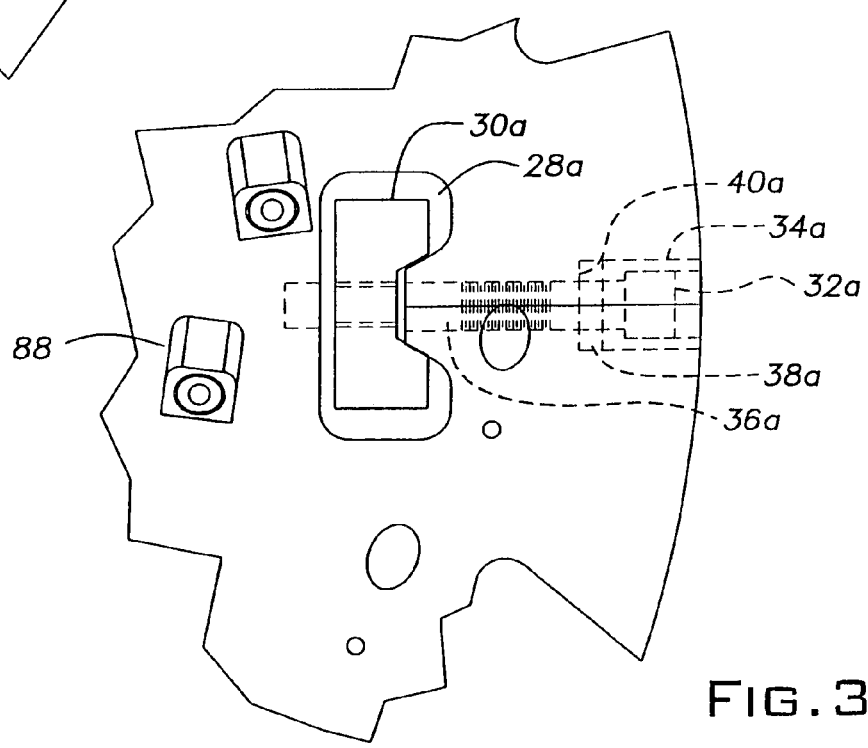
FIG. 3 is an assembled view of the arrangement of FIG. 2.

Turning now to the drawings, FIG. 1 shows an exploded view of the stump grinder assembly 10 comprising a wheel 12, a plurality of cutter blocks 14, and a plurality of cutting teeth 16 inserted in holes in the top and sides of the cutter block and the sides of the grinding wheel. The wheel 12 is composed of two identical halves 12a, 12b joined to one another in the manner to be hereinafter described in greater detail in connection with FIGS. 2 and 3.

Each half of the wheel has a mating surface 20 along the diameter thereof and a peripheral surface 22. The two mating surfaces include an axially positioned semicircular cut-out 24 adapted to be mounted on a hub (not shown). A pair of smaller semicircular cut-outs 26a, 26b are located near the axial cut-out along the mating surfaces and are adapted to receive a pair of conventional drive pins (not shown) extending through flanges in the hub. Radially outwardly thereof are slots 28a, 28b for receiving butterfly clamps 30a, 30b. A pair of bolts 32a, 32b passes through annular wheel keys 34a, 34b to be threaded into the clamp. Grooves or kerfs 36a, 36b extend radially outwardly from the slots 28a, 28b to an enlarged opening 38a, 38b forming an abutment shoulder 40a, 40b. The bolt 32 passes through the annular key 34 into the clamp 30 and is tightened against the key, which abuts against the shoulder 40.

Figure 4:
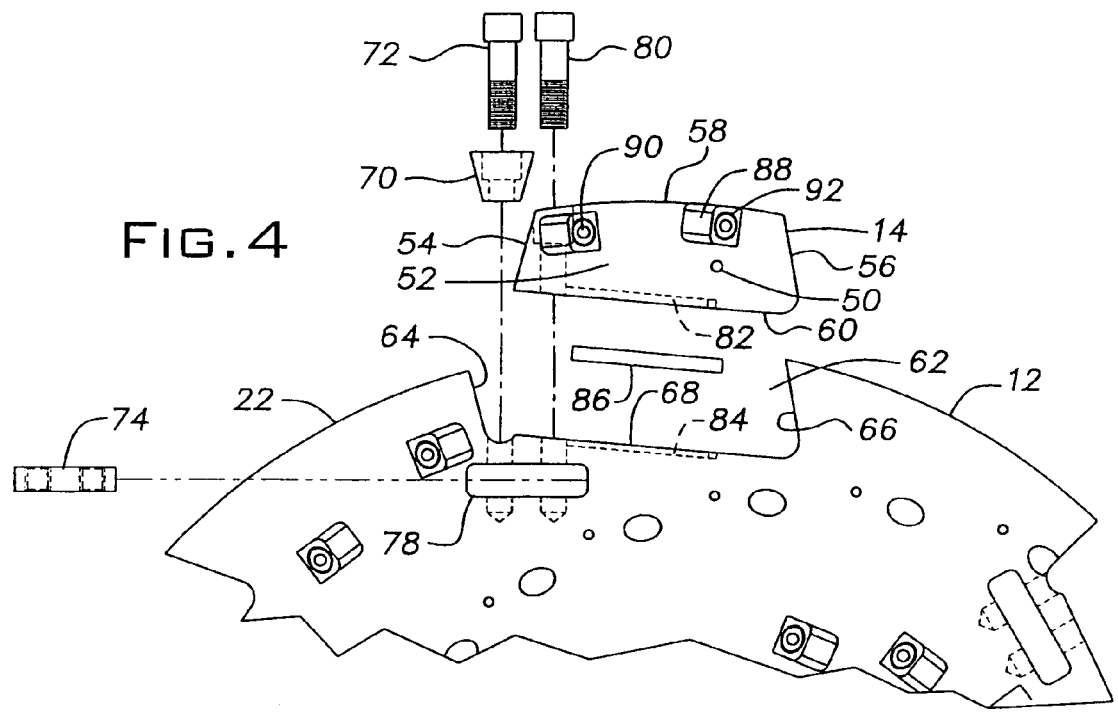
FIG. 4 is a partial exploded view of the wheel and cutter block.
Figure 5:
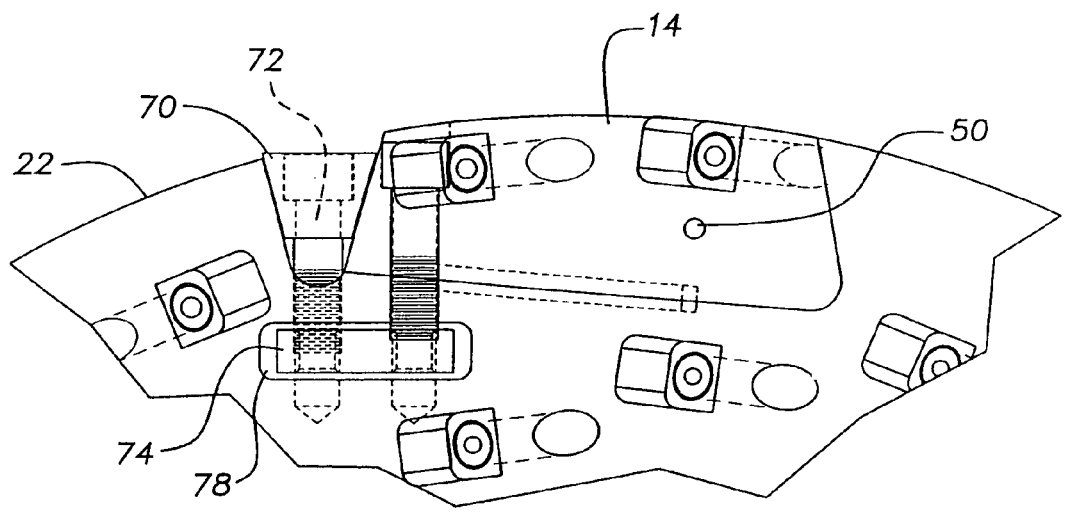
FIG. 5 is an assembled view of the cutter block assembly of FIG. 4.

Turning now to FIGS. 4 and 5, the details of a removable cutter block 14 and the manner in which it is fastened to the wheel is shown. The block 14 includes a pair of parallel sides (one side 52 being shown), a leading surface 54, a trailing surface 56, a top surface 58 and a bottom surface 60. The top surface 58 has a radius of curvature that matches that of the periphery of the wheel 12. A recess 62 is machined, etched or molded into the periphery of the wheel, forming a front 64 and a rear 66 separated by a base 68. The trailing edge 56 of the block 14 and the rear 66 of the recess in the wheel 12 preferably form an identical angle with respect to the bottom 60 of the block and the base 68 of the recess that is less than 90°, preferably on the order of about 70°–85°. The leading edge 54 of the block 14 and the front edge 64 of the recess diverge, forming a V into which a wedge 70 is inserted and is secured in place with a wedge bolt 72. The wedge bolt is threaded into a bolt plate 74 or a nut (not shown) inserted into a slot 78 machined or otherwise formed in the wheel 12 radially beneath the recess 62 and the block 14. A second bolt 80 holds the block in place, while the wedge forces the block into tight engagement with the back edge of the recess. Circumferential alignment is maintained between the block 14 and the recess 62 by suitable means, such as an elongated slot 82 in the bottom of the block, a corresponding slot 84 in the base of the recess, and a slot key 86 engaging both slots.

One or more holes 88 are machined at an angle into the block 14 to receive the cutting teeth 16. The holes include a circular portion 90 that receives the shank of the tooth, and a generally square seat 92 against which the shoulder of the tooth abuts. The circular portion of the mounting hole typically extends through to the opposite side of the block 14 or the wheel 12 where it appears as an oval 18.

Figure 6:
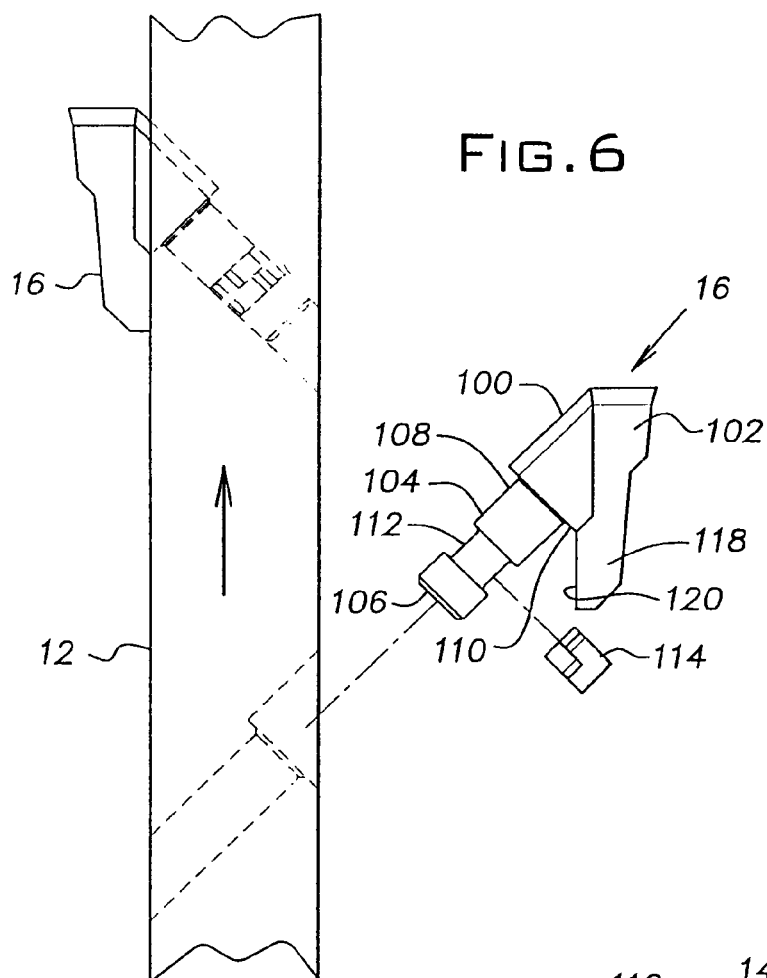
FIG. 6 is a view of the teeth of the present invention and their relationship to the cutting wheel.

FIG. 6 shows two teeth 16 and a partial end view of the cutting wheel 12. The wheel is intended to rotate in the direction shown by the arrow. Each tooth 16 includes a planar cutting face 100, a tooth body 102, a cylindrical shank 104 having a free end 106 and an abutment end 108 which forms a generally rectangular shoulder 110 where it intersects the body 102 of the tooth. The shank 104 typically forms an angle between about 30° and 60°, preferably about 45°, with respect to the cutting face 100 of the tooth. The shank typically includes a groove 112, which is engageable by a spring clip 114 or a spring pin 116 (shown in FIG. 7). The tooth 16 includes an extension 118 projecting rearwardly from the tooth face 100. This extension includes a planar surface 120 that rests against the side of the wheel 12 when the tooth shank 104 is inserted into a tooth hole 88.

Figure 7:
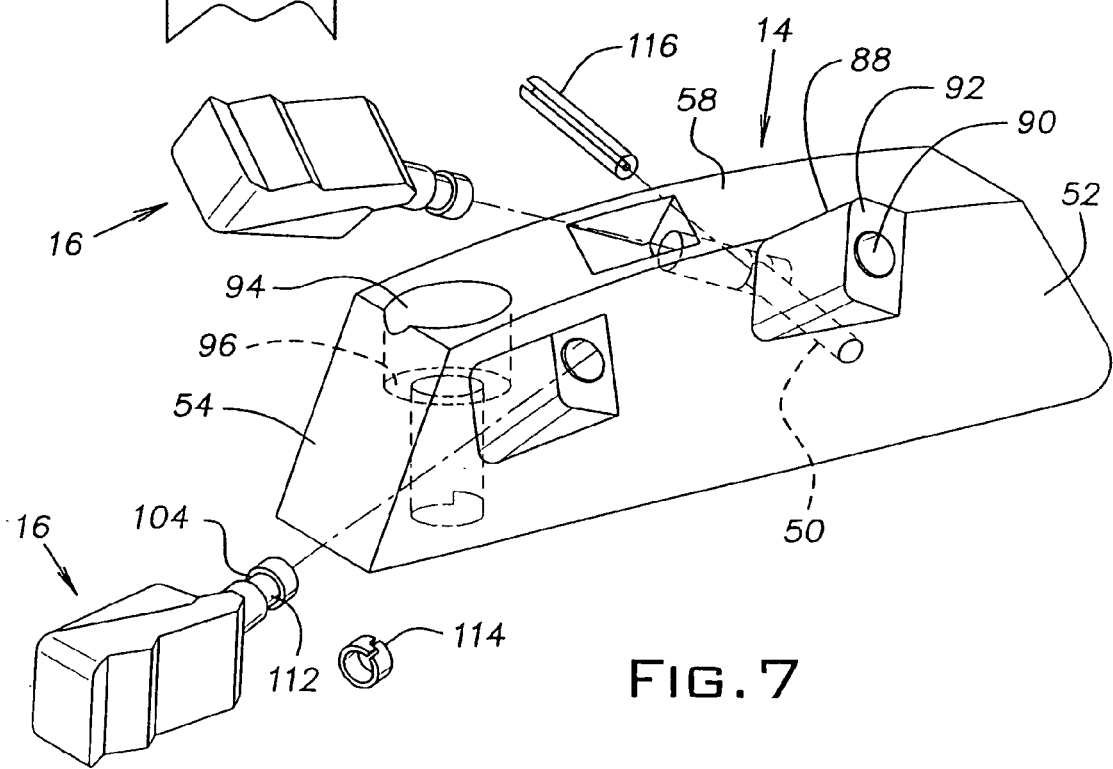
FIG. 7 is an exploded perspective view of the cutter block and teeth.

FIG. 7 shows the cutter block 14 in a perspective view with two cutting teeth 16 adapted to be inserted thereinto. Shown are the side 52, the leading edge 54, and the curved top 58 of the block. One hole 88 is shown in the top 58 and two holes are shown in the side 52 to receive the teeth 16. Each of these holes includes a shoulder 92 and a round portion 90 to receive the shank 104 of a tooth 16. A hole 94 extends vertically through the block 14 to receive a block bolt (not shown) and includes a shoulder 96 against which the head of the block bolt abuts. The tooth can be easily removed from a hole on the side of the block 14 or the wheel 12 by tapping the free end 106 of the tooth shank 104 with a hammer and a punch. The teeth on the top of the block are held by a spring pin 116 pressed into and extending through a hole 50 in the side of the block. These teeth can be easily disengaged from the block by driving out the spring pin and then tapping the free end of the tooth shank if it is accessible, or by prying it loose. The free end can be accessed by machining a hole through the sides of the block tangentially to the free end of the shank so that the shank can be tapped out.

The tooth is typically fabricated by suitable means, such as forging or casting. The face of the tooth preferably is made from a hard, impact resistant material, such as carbide steel brazed onto the body of the tooth.

As mentioned, the two halves of the wheel are assembled together around a hub with the two mating surfaces joined together. The butterfly clamp 30 is inserted into each of the slots 28, after which the bolt 32 is inserted through the key 34, and the groove 36 and is threaded into the clamp. When the two halves of the wheel are clamped together, a plurality of bolts is inserted into the holes 18 in the wheel and corresponding holes on the two flanges of the hub. The two holes formed by the cut-outs 26a and 26b are aligned with corresponding holes in the flanges. Drive pins are then inserted through the aligned holes so that the wheel is driven by the rotation of the hub on the shaft of a suitable power source. Instead of using drive pins, other drive means may be used, such as slotted wheel halves mounted on a splined drive shaft.

Typically, the number and placement of teeth in the cutter block and in the grinder wheel, as well as the angles and height of the cutting teeth with respect to the rotational direction of the cutting wheel, can be altered in accordance with established practices. Furthermore, other means, such as cotter pins, can be used for anchoring the teeth in the holes in the blocks and the wheel. Likewise, the number of removable cutter blocks and corresponding recesses in the cutter wheel can be increased or decreased depending on the overall size of the wheel and the blocks. The recesses normally should be evenly spaced around the periphery of the wheel for balance of the centrifugal forces during operation.

While the invention has been described in combination with embodiments thereof, it is evident that many alternatives, modifications and variations will be apparent to those skilled in the art in light of the foregoing teachings. Accordingly, the invention is intended to embrace all such alternatives, modifications and variations as fall within the spirit and scope of the appended claims. For example, the recesses and the cutter blocks can be shaped so that the each block is secured to the wheel using a pair of block bolts front and back instead of using a block wedge. Furthermore, the alignment of the blocks with the wheel can be achieved by using a plurality of alignment pins instead of a key and slotted keyway.

The teeth of the present invention can be used with other types of cutter wheels such as solid wheels with improved results. Likewise, the blocks of the present invention can be mounted on unitary cutting wheels, thereby enjoying the benefit and ease of replacing the blocks when worn or broken.

What is claimed is:

1. The combination of a split wheel to be mounted on a shaft of a tree stump grinder, the wheel comprising a first half and a second half joined to one another along the diametric surfaces thereof, each half having an axially positioned semicircular cut-out corresponding to the diameter of the stump grinder shaft, and means for removably joining the two halves together comprising a pair of clamping means, a plurality of recesses in the periphery of the wheel, each recess having a front edge, a bottom edge, and a back edge, a slot radially inwardly of each recess near the front edge thereof, and a nut plate in the slot having a threaded hole, the back edge being undercut to conform to the trailing surface of a cutter block, each recess containing a removable cutter block, the cutter block having a top surface with a radius of curvature corresponding to that of the wheel, a bottom surface that is co-planar with the bottom of the recess, two parallel side surfaces, a leading surface and a trailing surface, the trailing surface corresponding to the rear surface of the recess, and a least one hole to receive a removable cutting tooth, the hole extending from the top surface or a side surface of the block at an angle of inclination from the said surface toward the back surface of a block, the threaded fastener comprising a bolt adapted to be threaded into a nut plate positioned within the slot in the recess of the cutting wheel.

2. The combination according to claim 1 wherein the split wheel includes clamping means comprising a pair of butterfly clamps, a slot inboard of the semicircular periphery of each half extending in from each mating plane to receive one clamp, a groove along the mating surface joining each slot to the semicircular periphery to receive a bolt extending in from the periphery and through a key and threaded into one of the clamps to hold the two halves together, and a shoulder recessed beneath the peripheral surface to receive the key and the head of the bolt.

3. The combination according to claim 1 further including a block wedge, wherein the nut plate includes a second threaded hole and a threaded fastener extending through said block wedge threaded into the nut plate.

4. The combination according to claim 1 wherein the split wheel includes a circumferentially extending slot in the bottom of each recess, a corresponding slot in the bottom of each block, and an alignment key engaging said slots.

5. For a stump grinder mounted on a shaft, a split wheel comprising first and second semicircular halves joined to one another along the diametric surfaces thereof, the first half having an axially positioned semicircular cut-out corresponding to the diameter of the stump grinder shaft, the second half having an axially positioned semicircular cut-out corresponding to the diameter of the stump grinder shaft, a pair of butterfly clamps for removably joining the two halves together, a slot inboard of the semicircular periphery of each half extending in from each diametric surface to receive one clamp, a groove along the diametric surface joining each slot to the semicircular periphery to receive a bolt extending in from the periphery and through a key, said bolt threaded into one of the clamps to hold the two halves of the wheel together, and a shoulder recessed beneath the periphery to receive the key and the head of the bolt.

6. For a stump grinder mounted on a shaft, a split wheel comprising first and second semicircular halves joined to one another along the diametric surfaces thereof, the first half having an axially positioned semicircular cut-out corresponding to the diameter of the stump grinder shaft, the second half having an axially positioned semicircular cut-out corresponding to the diameter of the stump grinder shaft, a pair of clamps for removably joining the two halves together, a plurality of recesses in the periphery of said wheel, each recess shaped to receive a removable cutter block and having a front edge, a bottom edge, and a back edge, a threaded block fastener near the front edge, the rear edge being undercut to conform to the trailing surface of a cutter block.

7. The split wheel according to claim 6 including a circumferentially extending slot in the bottom of the recess adapted to receive an alignment key engageable with a corresponding slot in the bottom of each block.

8. The split wheel of claim 6 wherein the threaded block fastener comprises a slot radially inwardly of each recess and a nut plate in the slot having a threaded hole to receive the threaded block fastener.

9. The split wheel according to claim 8 wherein the nut plate includes a second threaded hole to receive a threaded fastener extending through a block wedge.

10. The split wheel according to claim 6 wherein each half includes a semicircular cut-out along the diametric surface on either side of the axially positioned cut-out, whereby each cut-out forms a non-axially located circular hole with the corresponding cut out on the other half.

* * * * *